United States Patent
Rendall

[11] Patent Number: 5,997,828
[45] Date of Patent: Dec. 7, 1999

[54] PROCESS FOR PRODUCTION OF ALUMINA FROM ORE BODIES CONTAINING ALUMINUM

[76] Inventor: John S. Rendall, 4301 Altura NE., Albuquerque, N. Mex. 87110

[21] Appl. No.: 09/164,135

[22] Filed: Sep. 30, 1998

[51] Int. Cl.[6] .............................. C22B 21/00; C22B 1/00; C01G 49/00
[52] U.S. Cl. ......................... 423/132; 423/123; 423/128; 423/140
[58] Field of Search .................................... 423/132, 123, 423/128, 140

[56] References Cited

U.S. PATENT DOCUMENTS 4,244,928  1/1981  Ziegenbalg et al. .................... 423/132

FOREIGN PATENT DOCUMENTS 1179919  8/1959  Germany ................................ 423/132

*Primary Examiner*—Steven Bos
*Attorney, Agent, or Firm*—Thomas E. Schatzel; Law Offices of Thomas E. Schatzel, A Prof. Corp.

[57] ABSTRACT

A process for extraction of alumina from ore bodies containing aluminum is disclosed. The process comprises the steps of acid leaching an aluminum bearing ore to produce a leach liquor that includes aluminum values and silicon values. Any ferrous sulfate in the leach liquor is oxidized with an oxidizing agent comprising ozone to ferric sulfate. The oxidized leach liquor is hydrolyzed at about 130° C. to form a gel of ferric values which are then removed. Any ferric sulfate remaining in the leach liquor after hydrolyzing is reduced to ferrous sulfate. The reduced leach liquor is then hydrolyzed at 165–180° C. to remove precipitated basic aluminum alkali sulfate. The basic aluminum alkali sulfate is then dried and calcined at around 950° C. to produce alumina and alkali sulfate which releases any $SO_2$ and any $SO_3$. The alumina is washed to remove any alkali sulfate and the washed alumina is then agglomerated and dried.

7 Claims, 2 Drawing Sheets

PROCESS FOR PRODUCTION OF ALUMINA FROM ORE BODIES CONTAINING ALUMINUM

BACKGROUND OF THE INVENTION

1. Field of the Invention

The invention relates generally to processes using sulfuric acid for the extraction/production of alumina for use in the production of aluminum from electrolyte and more specifically to processes which use a basic aluminum alkali sulfate as an intermediate-stage product.

2. Description of the Prior Art

The conventional methods of producing aluminum are not environmentally friendly. The aluminum industry produces in excess of forty million metric tons of green-house gas emissions worldwide each year. The use of so-called "inert anodes" in the production of aluminum has long been recognized as a solution to these emissions, but the high electrolysis temperatures needed, e.g., 950° C., have proven too challenging for commercial production with inert anodes. Such process starts with alumina in the "Bayer process" and uses a caustic as an extractant. The alumina produced from the process embodiment of the present invention can be used at temperatures significantly lower in electrolysis for production of aluminum and therefore reduces the challenge of inert anode use at this reduced temperature.

In order to meet the alumina demand which results from the benefits of operation of electrolytic production of aluminum at 750° C., the industry will need to examine the retrofit capability of technology to current production of alumina as well as new greenfield projects.

This application applies to greenfield projects using low cost raw materials. The use of the process for retrofit of existing production facilities is covered separately as it does not need iron removal steps for the production of "cell grade" alumina.

In many conventional processes, sulfuric acid is used as an extractant. Acid leaching leaves tailing ponds with residual acid and other residues. This environmental consequence has been a significant deterrent to commercial scale production using this method. In other processes, the loss of expensive reagents, yield losses, and reagent-recycling issues have contributed to increased costs of capital and operation. For a description of such methods and issues, see U.S. Pat. No. 4,526,763, which generally dwells on the subject of sodium or potassium metal contaminant in alumina production.

SUMMARY OF THE PRESENT INVENTION

An object of the present invention is to provide a method for the production of alumina that is suitable in the low-temperature smelting of aluminum by electrolysis.

Another object of the present invention is to provide a method for the simultaneous production of alumina that is suitable in the low-temperature smelting of aluminum by electrolysis, and of a titanium dioxide substitute suitable for use as a pigment and filler in pigment industries.

Briefly, a method embodiment of the present invention includes a process for the extraction and production, using sulfuric acid, of alumina for use in the electrolyte production of aluminum. The process makes use of the intermediate-stage product of a basic aluminum alkali sulfate. Alkali neutralization of the acidic leach liquor is used with alkali removal in the calcination stage as a sulfate. This is either split into alkali and sulfuric acid by electrolysis for recycle of the alkali or sold into the fertilizer market as a sulfate. All steps involve pressure-leaching, hydrolysis, and filtration. An inert residue for back fill results from the process. Alumina of particular use in low temperature, around 750° C., electrolysis for aluminum is the main characteristic of the product.

An advantage of the present invention is that an environmentally friendly process is provided for producing aluminum.

Another advantage of the present invention is that an inexpensive process is provided for the simultaneous production of alumina for aluminum-electrolysis and a substitute for titanium dioxide.

These and other objects and advantages of the present invention will no doubt become obvious to those of ordinary skill in the art after having read the following detailed description of the preferred embodiment that is illustrated in the drawing figures.

IN THE DRAWINGS

FIG. 1 is a flow diagram of a first process embodiment of the present invention for the extraction and production of alumina using sulfuric acid usable in the electrolyte production of aluminum; and FIG. 2 is a flow diagram of a second process embodiment of the present invention for the extraction and production of alumina usable in the electrolyte production of aluminum and a white pigment for use in the pigment industry.

DETAILED DESCRIPTION OF THE PREFERRED EMBODIMENTS

Figure 1:
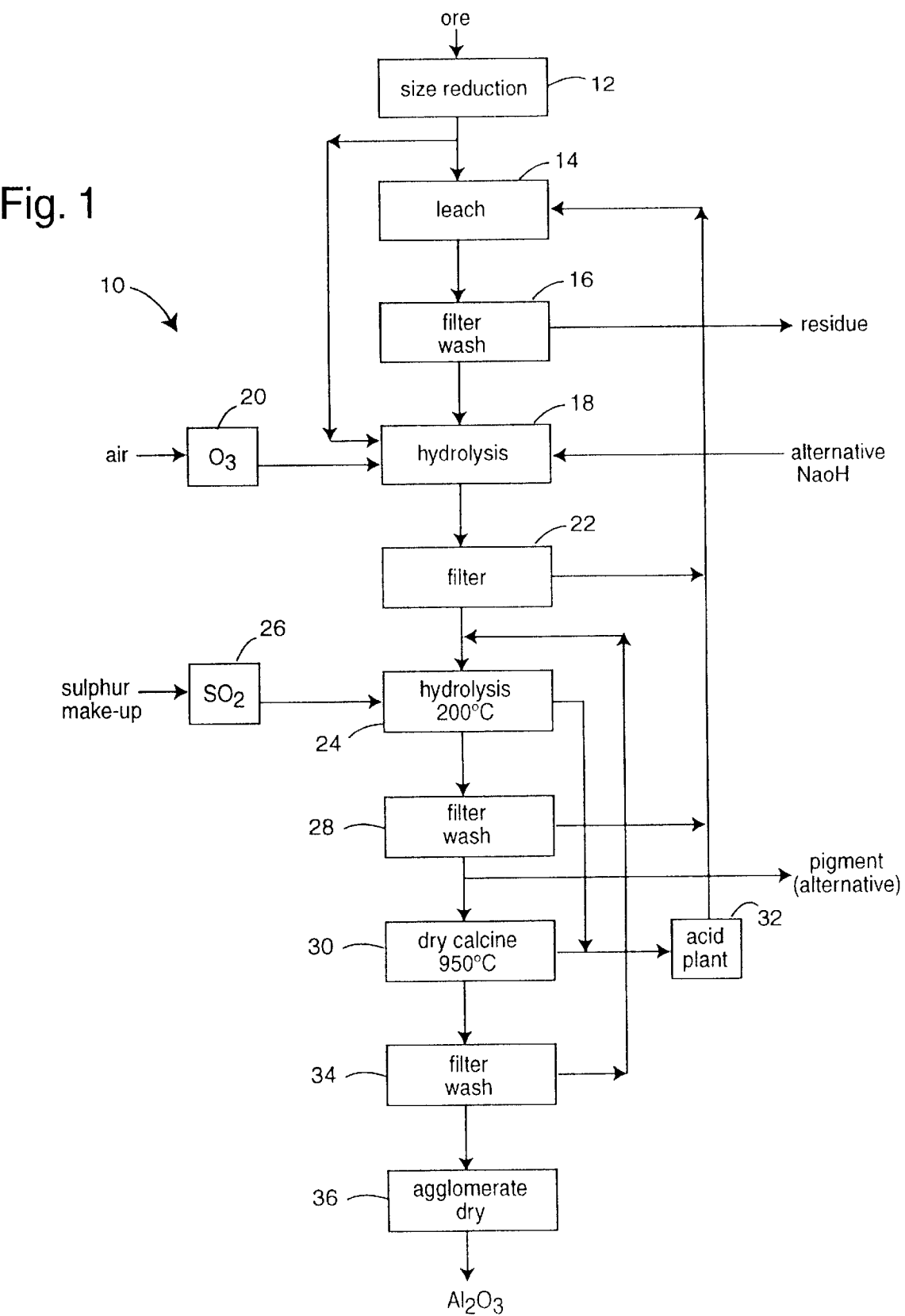

FIG. 1 illustrates a process embodiment of the present invention, and is referred to by the general reference numeral 10. The process 10 is a process for the extraction and production of alumina, using sulfuric acid, for use in the electrolyte production of aluminum. The process 10 makes use of the intermediate-stage product of a basic aluminum alkali sulfate. Alkali neutralization of the acidic leach liquor is used with alkali removal in the calcination stage as a sulfate. This is either split into alkali and sulfuric acid by electrolysis for recycle of the alkali or sold into the fertilizer market as a sulfate. All steps involve pressure-leaching, hydrolysis, and filtration. An inert residue for back fill results from the process. Alumina of particular use in low temperature, around 750° C., electrolysis for aluminum is the main characteristic of the product.

The process 10, shown in FIG. 1, comprises a size reduction step 12. Ore, such as bauxite or clay containing alumina, is mined and delivered to a size-reduction unit. A size-reduction unit may not only be used for oversize removal, but also could be used to benefit the ore removing waste material and ensure the particles are less than 0.25 inch for feed to a leach section. A leaching step 14 receives a sulfuric acid, recycle filtrate and fresh and/or partially leached ore. Pressure autoclaves, either batch or continuous at about 165° C. to 180° C., are employed with residence times around thirty minutes depending on the ore used. The acid content of the sulfuric should preferably be above fifty-five percent, with around ten percent of excess acid being used. In a filter-wash step 16, a centrifuge or a pressure filter, preferably a belt or continuous type, outputs a filtrate with the alumina values, and also a residue with most of the alumina values removed, neutralized by either lime or caustic. The filtrate, with alumina, is moved onwards in the process to recover "cell grade" alumina. The residue is suitable for backfill into the mine and subsequent dry land reclamation. In a step 18, a hydrolysis of the leach liquor is done in an oxidizing atmosphere at about 130° C. wherein the oxygen is provided in a step 20. In other words, the oxidized leach liquor is hydrolyzed at about 130° C. to remove a gel of ferric values.

As much iron as possible must be precipitated from the liquor as ferric hydroxide, as well as the heavy metal impurities of magnesium hydroxide and others. Neutralization is accomplished by adding in fresh ore containing alumina and/or caustic. A step 22 separates the leach liquor from the partially leached ore and the ferric hydroxide, e.g., by pressure filtration. A leach liquor with alumina value moves on to a step 24 and the partially leached residues are leached again for remaining alumina values by returning them to step 14. The leach liquor from step 22 is hydrolyzed in step 24 at around 200° C. in batch or continuous autoclaves. A residence time of two to about fifteen minutes is used under conditions such that the ferric ions are reduced to ferrous ions, with make-up $SO_2$, step 26. In a step 28, the precipitated basic aluminum alkali salt is separated from the raffinate by centrifuges or pressure filters. Such raffinate is recycled to steps 14 or 16, preferably to be used as a carrying medium for residue from step 22 to step 16 as a dilution for the concentrated sulfuric acid from $SO_2/SO_3$ from a later step. In a dry/calcine step 30, a basic aluminum salt from step 28 is dried and calcined at around 950° C., e.g., (Alkali $Na/K)_2SO_43Al_2O_34(SO_3)9H_2O \rightarrow (Na/K)_2SO_4 + 3Al_2O_3 + SO_2 + 3SO_3 + 9H_2O$.

The equipment used can be conventional direct and/or indirect fired rotary kilns, but preferably they are indirect heated paddle dryers (porcupine) followed by fluid flash calciners, the same as those used in the industrial production of alumina from aluminum hydroxide. The gases of $SO_2/SO_3$ are then converted to sulfuric acid in conventional contact acid plants in a step 32. In a step 34, calcined alumina is separated from a water soluble Na/K sulfate in a counter-current washing process, and then it is passed through a centrifuge or pressure filter. A solubulised Na/K sulfate is recycled to step 24. A diluted sulfuric acid wash, followed by a water wash, could also be used. Excess Na or K ions are removed as a pigment titanium dioxide in step 30 or as sulfates from the products which may be used as a substitute for recycle stream from step 34 to step 24. Both the pigment and the alkali sulfate could be sold as commercial products, e.g., the pigment to the paper industry, and the $Na_2SO_4$ to the fertilizer industry. Any excess Na/K ions that come from the ore body and/or step 18 are involved by neutralization. A step 36 involves agglomerating the centrifuge or filter cake of alumina from step 34 and drying the agglomerates. A binding agent may be used in the final step of the pressure filtering after washing, and before discharging the filter cake to an agglomeration mechanism in step 36. The output at the bottom of FIG. 1 is a "cell grade" alumina with Na ions not in excess of that accepted for alumina currently in use for electrolytic production of aluminum.

The methods of the present invention can be applied to the production of alumina from most of the ore bodies in the world. These methods address the iron impurity issues and the use of reagents, an environmental concern. The product alumina of method embodiments of the present invention allows for low-temperature aluminum electrolysis, e.g., at temperatures around 750° C. instead of 950° C. This lower temperature reduces $CO_2$ emissions from the carbon anodes, and lower energy use and therefore cost.

In method embodiments of the present invention, leaching is carried out by sulfuric acid at temperatures around 180° C., in batch or continuous autoclaves, and with an acid strength in excess of fifty percent sulfuric acid ($H_2SO_4$). The residence time varies with the ore used. In general, around thirty minutes will solubilise a majority of the alumina while facilitating iron removal by oxidation of the ferrous (soluble) ions to ferric (insoluble) ions under the conditions. Centrifuges or batch continuous pressure filters of the belt variety have provided consistent solid liquid separation with the ability to provide a neutralized residue for backfill. The neutralization agent could be lime or caustic which is recycled into the process. To remove most of the remaining iron and other impurities such as calcium (Ca) and magnesium (Mg) from the leach liquor, it is necessary to increase the pH to around three in oxidizing conditions which precipitates the majority of these impurities as hydroxides. But, should incoming ore be utilized to provide the alumina necessary to reduce the $H_2SO_4$, the hydroxides precipitated with the partially leached ore, proceed to the final leaching at 180° C. and then are discarded to backfill with the neutralized residues. Alternatively, the hydrolysis of the pH adjusted oxidized leach liquor at around 130° C. provides a precipitate of mainly hydroxides (ferric, magnesium, etc.) and some sulfates (Al, alkali). The Al, alkali, ions can be solubilised in a caustic medium and recycled, thus reducing the ions of alumina and reagents.

The final leach liquor, with the pH adjusted to around three, is reduced to keep the iron (Fe) ions in solution in the ferrous state for hydrolysis at around 200° C. A pure product of the basic double salt of aluminum and alkali sulfate is produced. After drying and calcination of the alumina component at about 950° C., the product is washed free of the alkali sulfate to meet current specifications of cell grade alumina. It is then agglomerated and dried for use in electrolytic production of aluminum. The product yield in the hydrolysis step at 200° C., is dependent on pH and residence time. Experimental work has shown that temperatures of around 200° C., at pH between two and three, and a fifteen minute residence time yields around ninety percent on a batch basis. The rest is recycled. Calcination and washing of the alkali sulfates has produced alumina with minimum alkali contents. Such are substantially the same as the alumina produced for electrolytic production of aluminum by the Bayer (caustic) process. $SO_2/SO_3$ from calcination produces concentrated sulfuric acid necessary for the leaching step. All the waste liquid streams contain aluminum and or alkali sulfates which are recycled. A small purge may be necessary from time to time to maintain impurities to the levels necessary for obtaining a sufficiently pure alumina product.

Figure 2:
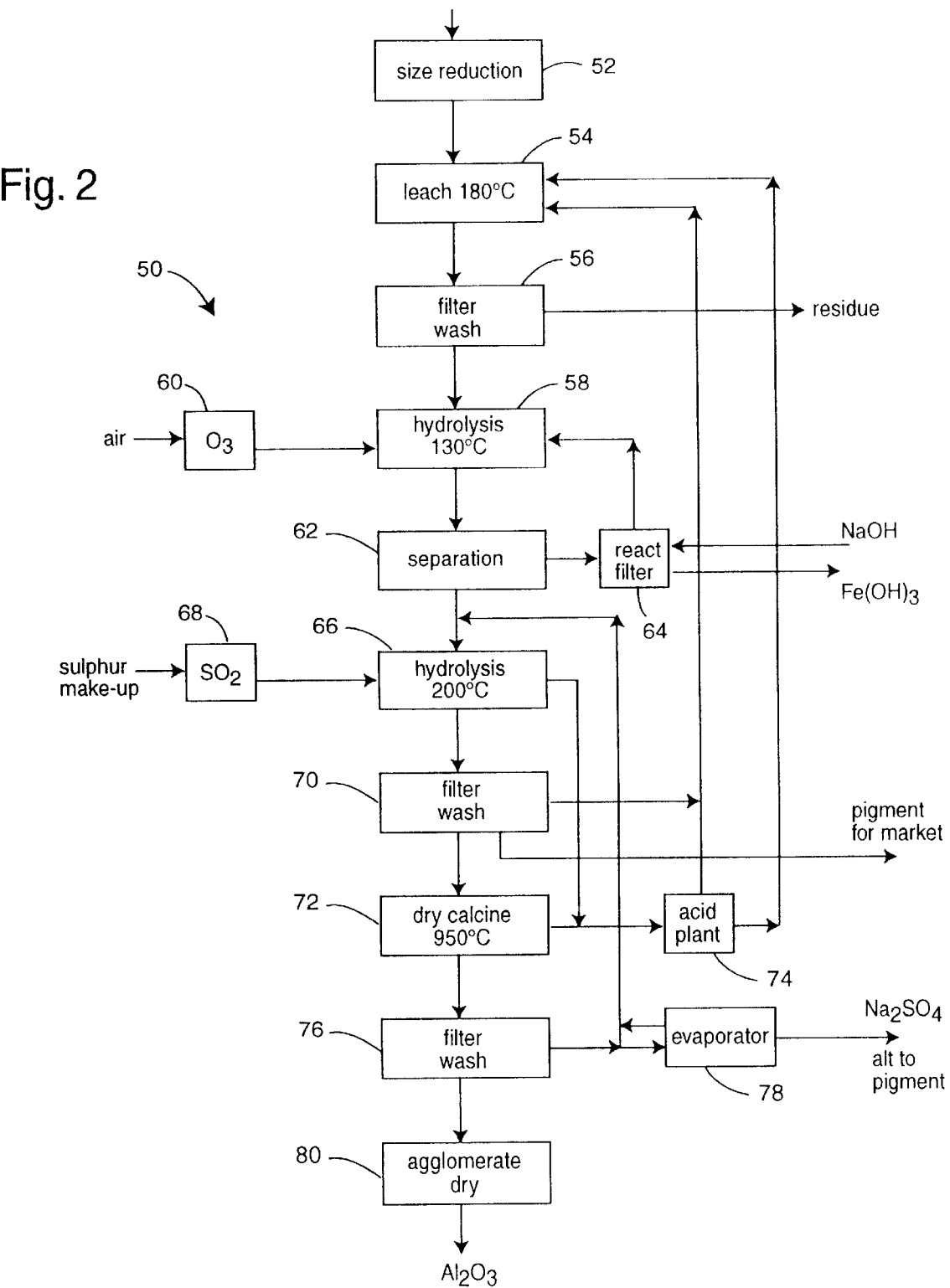

FIG. 2 shows an alternative method 50 of alumina production from an ore body. The process 50 produces a co-product of pigment (basic aluminum alkali sulfate), e.g., for use in the paper industry. The amount of pigment co-produced corresponds to the amount of fresh alkali needed for neutralization in step 22 of method 10 in FIG. 1, wherein no fresh ore is used. The iron (ferric) hydroxide from step 24 in process 10 may be co-precipitated under certain conditions from using Al/alkali sulfates, e.g., Jarrite instead of Goetite. Such requires the removal of the alkali/aluminum sulfate at an increased pH with the ferric hydroxide filtered and dried. The dried filter cake can be used as a high value pigment or lower value feed for steel production from electric arc furnaces.

The process 50, shown in FIG. 2, comprises a size reduction step 52. Ore, such as bauxite or clay containing alumina, is mined and delivered to a size-reduction unit. A size-reduction unit may not only be used for oversize removal, but also could be used to benefit the ore removing waste material and ensure the particles are less than 0.25 inch for feed to a leach section. A leaching step 54 receives a sulfuric acid recycle filtrate and fresh and/or partially leached ore. Pressure autoclaves either batch or continuous at about 180° C. are employed with residence times around thirty minutes depending on the ore used. The acid content of the sulfuric should preferably be above fifty-five percent, with around ten percent excess acid being used. In a filter-wash step 56, a pressure filter, preferably a belt or continuous type, outputs a filtrate with the alumina values, and also a residue neutralized by either lime or caustic. This causes more of the alumina values to be removed. The filtrate, with alumina, is moved onwards to a conditioner to recover "cell grade" alumina. The residue is suitable for backfill into the mine and subsequent dry land reclamation. In a step 58, a hydrolysis of the leach liquor is done in an oxidizing atmosphere at about 130° C. wherein the oxygen is provided in a step 60.

As much iron as possible must be precipitated from the liquor as ferric hydroxide, as well as the heavy metal impurities of magnesium hydroxide and others. Neutralization is accomplished by adding in caustic. A step 62 separates the leach liquor from the ferric hydroxide, e.g., by pressure filtration. A leach liquor with alumina value moves on to a step 64. The step 64 also receives NaOH and outputs $Fe(OH)_3$ to the external world. The leach liquor from step 62 is hydrolyzed in step 66 at around 200° C. in batch or continuous autoclaves. A residence time of about fifteen minutes is used under conditions such that the ferric ions are reduced to ferrous ions, with make-up $SO_2$ step 68. This in order to maintain iron in solution while the basic aluminum alkali salt is precipitated, e.g., with a yield of around ninety percent. In a step 70, the precipitated basic aluminum alkali salt is separated from the raffinate by pressure filters. Such raffinate is recycled to steps 54, preferably to be used as a carrying medium for residue from step 62 to step 56 as a dilution for the concentrated sulfuric acid from $SO_2/SO_3$ from a later step. In a dry/calcine step 72, a basic aluminum salt from step 68 is dried and calcined at around 950° C., e.g., (Alkali Na/K)$_2$3Al$_2$O$_3$4(SO$_3$)9H$_2$O→(Na/K SO$_4$)$_3$3Al$_2$O$_3$+SO$_2$+2SO$_3$+9H$_2$O. The equipment used can be conventional and/or indirect fixed rotary kilns, but preferably the fluid flash calciners are the same as those used in the industrial production of alumina from aluminum hydroxide. The gases of $SO_2/SO_3$ are then converted to sulfuric acid in conventional contact acid plants in a step 74. In a step 76, calcined alumina is separated from a water soluble Na/K sulfate in a counter-current washing process, and then it is passed through a pressure filter. A solubulised Na/K sulfate is recycled to step 66. A diluted sulfuric acid wash, followed by a water wash, could also be used. Excess Na or K ions are removed as pigment product in step 70 or as sulfates from the recycle stream from a step 78. Both the pigment product and the alkali sulfate could be sold as commercial products, e.g., the pigment to the paper industry, and the Na$_2$SO$_4$ to the fertilizer industry. Any excess Na/K ions that come from the ore body and/or step 62 are involved by neutralization. A step 80 involves agglomerating the filter cake of alumina from step 76 and drying the agglomerates. A binding agent may be used in the final step the pressure filtering after washing, and before discharging the filter cake to an agglomeration mechanism in step 80. The output at the bottom of FIG. 2 is a "cell grade" alumina with Na ions not in excess of that for alumina currently in use for electrolytic production of aluminum.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process for extraction of alumina from ore bodies containing aluminum, the process comprising the steps of:

acid-leaching an aluminum-bearing ore to produce a leach liquor that includes aluminum values and silicon values;

oxidizing any ferrous sulfate values in said leach liquor to substantially all ferric sulfate with an oxidizing agent;

hydrolyzing said oxidized leach liquor at about 130° C. to form a gel of ferric values which are then removed;

reducing any ferric sulfate remaining in said leach liquor after hydrolyzing to ferrous sulfate, and then hydrolyzing said reduced leach liquor at 165° C. to 180° C. to remove precipitated basic aluminum alkali sulfate from said reduced leach liquor;

drying and calcining said basic aluminum alkali sulfate at around 950° C. to produce alumina and an alkali sulfate, and releasing any $SO_2$ and any $SO_3$;

washing out any alkali sulfate from said alumina; and agglomerating and drying said washed alumina.

2. The process of claim 1, wherein:

said ferric values are converted to $Fe(OH)_3$ and Na/K sulfates by adding a near stoichiometric quantity of alkali.

3. The process of claim 1, wherein:

a filtrate obtained from the step of washing out any alkali sulfate is recycled to the acid-leaching step.

4. The process of claim 1, wherein:

any $SO_2$ and any $SO_3$ which is produced is formed into sulfuric acid and recycled to the acid-leaching step.

5. The process of claim 1, wherein:

said leach liquor solution includes at least one of $Na_2SO_4$ and $K_2SO_4$ and is recycled to the hydrolyzing step.

6. The process of claim 4, wherein:

an oxidation agent is mixed with an $SO_2$ input stream before conversion of $SO_2$ and $SO_3$ to sulfuric acid for recycling.

7. The process of claim 1, wherein:

the oxidation agent comprises ozone in the oxidizing step.

* * * * *